Figure 1:
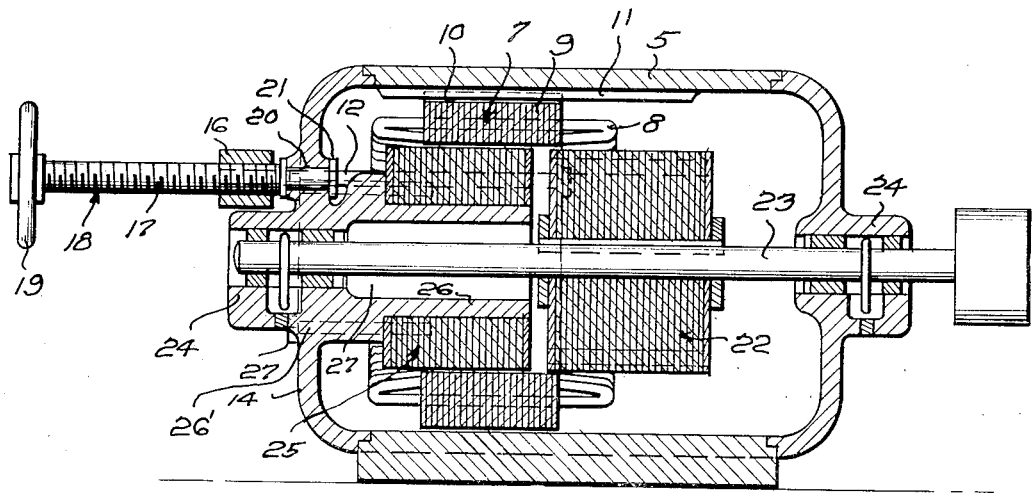

July 25, 1933.  A. B. CHEW  1,919,774

VARIABLE SPEED ALTERNATING CURRENT MOTOR

Filed Oct. 5, 1931

Inventor
Albert B. Chew,
By B. P. Fishburn
Attorney

Patented July 25, 1933

1,919,774

UNITED STATES PATENT OFFICE

ALBERT B. CHEW, OF PHILADELPHIA, PENNSYLVANIA

VARIABLE SPEED ALTERNATING CURRENT MOTOR

Application filed October 5, 1931. Serial No. 567,090.

My invention relates to improvements in a variable speed polyphase alternating current motor.

I am aware of the fact that variable speed induction motors have been provided. One type of such motor includes the use of slip rings. This type of motor is complicated, as it necessitates the use of collector rings and brushes, external resistance and other speed controlling elements. I am also aware of the fact that it has been proposed to regulate the speed of an induction motor by longitudinally shifting the rotor with respect to the stator, and constructing the rotor in two sections. This rotor is of the squirrel cage type, and embodies two sections, one section being inductive, and the other section non-inductive as shown in United States Patent No. 1,772,719. The speed of the motor is reduced by withdrawing the inductive section of the squirrel cage rotor from within the stator while introducing the non-inductive section into the stator. This construction is open to the disadvantage that the squirrel cage rotor winding which is continuous is increased in length and accordingly rendered more complicated and expensive as shown in said Patent No. 1,772,719. This type of rotor also necessitates the use of a prolonged length of winding on the rotor, with the result that there are losses introduced into the rotor circuit, due to the added resistance of the non-inductive section. Such a type of motor is shown in Letters Patent No. 1,772,719, granted to C. E. Johnson, under date of August 12th, 1930.

It has also been proposed to regulate the speed of an induction motor by providing two separate squirrel cage rotors having high and low resistance windings, and to shift the stator so that it alternately covers either rotor, or combination of the two. This construction is open to the objection that the use of two squirrel cage windings is complicated and expensive. An induction motor of this type is shown in Letters Patent No. 514,902, granted to C. S. Bradley, under date of February 20th, 1894.

In accordance with my invention, I provide an induction motor having a stator and rotor, with means to effect relative longitudinal movement between the same, whereby the stator will cover different lengths of the rotor, regulating its speed of rotation, or may completely uncover the same so that the rotor will stop. The rotor is in the form of the usual squirrel cage winding, and when the stator is shifted with respect to the rotor, for partly or wholly uncovering the rotor, the space or gap within the stator is replaced or filled by a magnetic core having no winding or squirrel cage construction. This magnetic core is formed of laminated metal sheets, having high magnetic permeability. The presence of the laminated iron core which replaces the rotor preserves the continuity of the magnetic circuit of the stator. If this core were not present, the magnetic circuit of the stator would be broken, increasing the magnetic reluctance of the stator and burning up the stator winding, due to excessive currents in the stator winding.

Figure 2:
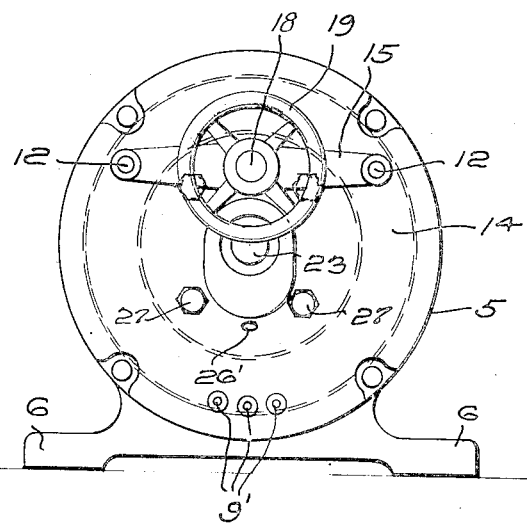

In the accompanying drawing, forming a part of this specification, and in which like numerals are employed to designate like parts throughout the same, Figure 1 is a central vertical longitudinal section through an induction motor, embodying the invention, and Figure 2 is an end elevation of the same.

Attention being called first to Figures 1 and 2, the numeral 5 designates the casing or housing of the motor, mounted upon legs 6, as is customary.

Mounted within the casing 5 is a stator 7, positively held against rotation, but capable of being shifted longitudinally. This stator is of the usual type employed in a polyphase alternating current induction motor, and has windings 8 of the usual construction. The windings are supplied to these windings through current is supplied to these windings through wires 9', direct from the line. The stator 7 also embodies the usual laminated iron structure or ring 9, which may be provided in its periphery with a longitudinal groove 10, to receive a rib 11, rigidly secured to the top of the casing, thus effecting a splined connection between the structure 9 and the casing, to permit of the structure sliding longitudinally and positively holding the same against rotation. The structure 9, preferably has a sliding fit within the casing 5.

Means are provided to shift the stator 7 longitudinally, comprising a pair of horizontal rods 12, passing through the laminated structure 9, outwardly of the windings 8, and clamped thereto. These rods are slidably mounted within openings, formed in one end 14 of the casing 5, and extend to the exterior of the same, and are rigidly clamped to a cross-head 15. This cross-head has a centrally arranged boss 16, provided with a screw-threaded opening, receiving the screw-threaded portion 17 of adjusting shaft 18, provided at its outer end with a hand wheel 19, to turn the same. The inner end of this adjusting shaft is smooth, and is rotatably mounted within an opening 20, formed in the end 14, and carries rings 21, rigidly clamped thereto, to prevent longitudinal movement of the adjusting shaft. It is thus seen that by turning the hand wheel 19, the stator 7 may be longitudinally shifted within the casing 5. The invention is in no sense restricted to the precise form of shifting means shown.

The motor further embodies a rotor 22, of the closed circuit squirrel cage type. This rotor is of the usual construction present in polyphase induction alternating current motors, and is of the usual squirrel cage construction. The rotor 22 is mounted upon a rotor shaft 23, having rotation therewith, and this shaft is journaled in suitable bearings 24. Particular attention is called to the fact that the complete rotor 22 is of substantially the same length as the structure 9 of the stator, to completely fill the space or recess of the stator, when the stator is shifted over the same to the extreme high speed position. Operating in conjunction with the stator 5 is a magnetic core 25. This core is formed of laminated metal plates, such as iron plates, having a high magnetic permeability. The magnetic core 25 constitutes no part of the squirrel cage rotor, and has no windings or squirrel cage construction, and is arranged in end-to-end relation with the rotor 22, and is of the same length as the rotor 22, and is adapted to enter the space or recess of the structure 9, of the stator. The function of the magnetic core 25 is to maintain unbroken the magnetic circuit of the stator, as the stator is shifted from the rotor 22 upon the magnetic core 25. If the magnetic core 25 were not present to fill the space or recess of the stator, the magnetic circuit of the stator would be broken, resulting in an increase in magnetic reluctance and stator current, and possible burning up of the stator windings.

This magnetic core is held stationary and is mounted upon a tubular extension 26 of the end 14 of the casing, and is bolted to the end 14, as shown at 27. The rotor 22 and core 25 are disposed in end-to-end relation, but there is a slight space between the ends of the same, to permit of the rotation of the rotor without liability of the same contacting with the stationary magnetic core. Since the core 25 does not rotate, its periphery may fit closely within the ring or structure 9 of the stator, and may have practically a sliding fit therein, thus reducing the air gap to the minimum. This is an advantage of the present invention.

In the operation of the second form of the invention, the stator 7 is shifted to the right, to partly or wholly cover the rotor 22, depending upon the desired speed, and is shifted to the left to reduce the speed or to stop the motor.

The magnetic core 25 serves to maintain the magnetic circuit of the stator unbroken, as the same moves over the magnetic core from the rotor 22, as heretofore explained. The stationary core 25 has a further advantage that the same is mounted upon the tubular extension 26, which will provide additional ventilation, air entering through ports 26' into the space 27. The rotor 22 is of the same length as the structure or ring 9 of the stator, and the magnetic core 25 is of the same length as the rotor.

It is to be understood that the forms of my invention herewith shown and described, are to be taken as preferred examples of the same, and that various changes in the shape, size and arrangement of parts may be resorted to without departing from the spirit of the invention or the scope of the subjoined claims.

Having thus described my invention, what I claim is:

1. In an alternating current induction motor, a stator, a squirrel cage induction rotor, a magnetic core free from windings arranged in end-to-end relation with the rotor, means to hold the magnetic core stationary, and means to move the stator longitudinally of the rotor and core.

2. In an alternating current induction motor, a casing, a stator mounted within the casing, a supporting extension carried by one end of the casing and projecting longitudinally within the same, a rotatable shaft extending through the casing and supporting extension, a squirrel cage induction rotor mounted upon the shaft to turn therewith, a magnetic core free from windings arranged in end to end relation with the rotor and clamped to the supporting extension, and means to move the stator longitudinally within the casing with relation to the rotor and core.

3. In an alternating current induction motor, a casing, a stator mounted within the casing to move longitudinally thereof, a supporting extension carried by one end of the casing and projecting longitudinally within the casing, said supporting extension having a shoulder, a shaft extending longitudinally through the casing and supporting extension, a squirrel cage induction rotor mounted upon the shaft to turn therewith, an annular magnetic core free from windings arranged in end to end relation with the rotor and mounted upon the supporting extension, bolts clamping the magnetic core against the shoulder of the supporting extension, and means to move the stator longitudinally of the core and rotor.

4. In an alternating current induction motor, a stator, a squirrel cage induction rotor, a magnetic core free from windings arranged in end to end relation with the rotor and adapted to have substantially a sliding fit within the stator, and means to move the stator longitudinally with relation to the core and rotor.

5. In an alternating current induction motor, a casing, a stator arranged within the casing, a tubular supporting extension carried by one end of the casing, a shaft extending longitudinally through the casing and tubular supporting extension with the wall of the tubular supporting extension spaced from the same, a squirrel cage induction rotor mounted upon the shaft, a magnetic core free from windings arranged in end to end relation with the rotor and mounted upon the tubular supporting extension, means to hold the magnetic core stationary upon the tubular supporting extension, and means to move the stator longitudinally of the rotor and core.

ALBERT B. CHEW.